July 16, 1940.    R. W. BROWN    2,208,538
VEHICLE SUSPENSION
Filed Sept. 17, 1937     3 Sheets-Sheet 1

INVENTOR
Roy W. Brown
BY Albert L. Ely
ATTORNEY

July 16, 1940.   R. W. BROWN   2,208,538
VEHICLE SUSPENSION
Filed Sept. 17, 1937   3 Sheets-Sheet 2
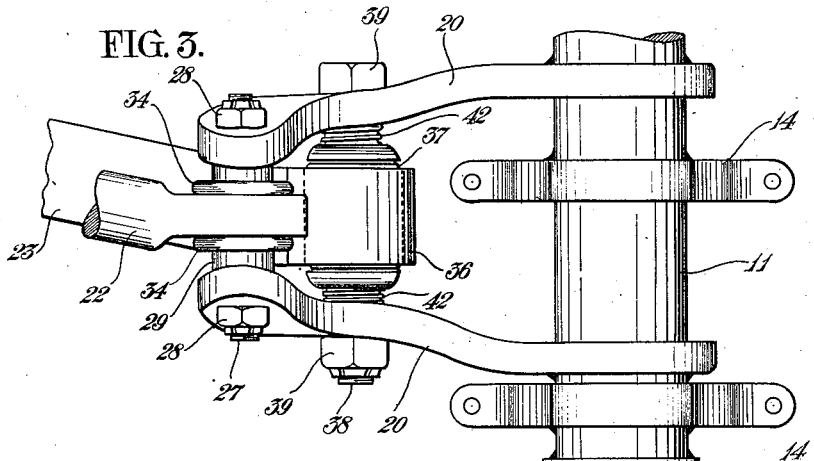
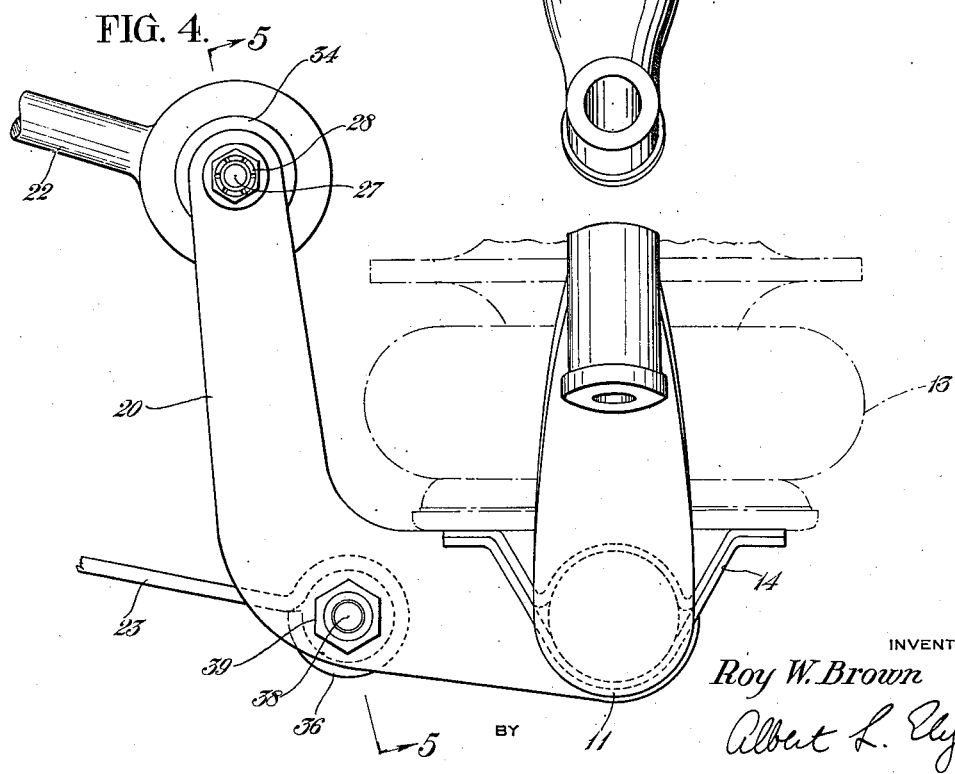
INVENTOR
Roy W. Brown
BY Albert L. Ely
ATTORNEY July 16, 1940.  R. W. BROWN  2,208,538
VEHICLE SUSPENSION
Filed Sept. 17, 1937  3 Sheets-Sheet 3
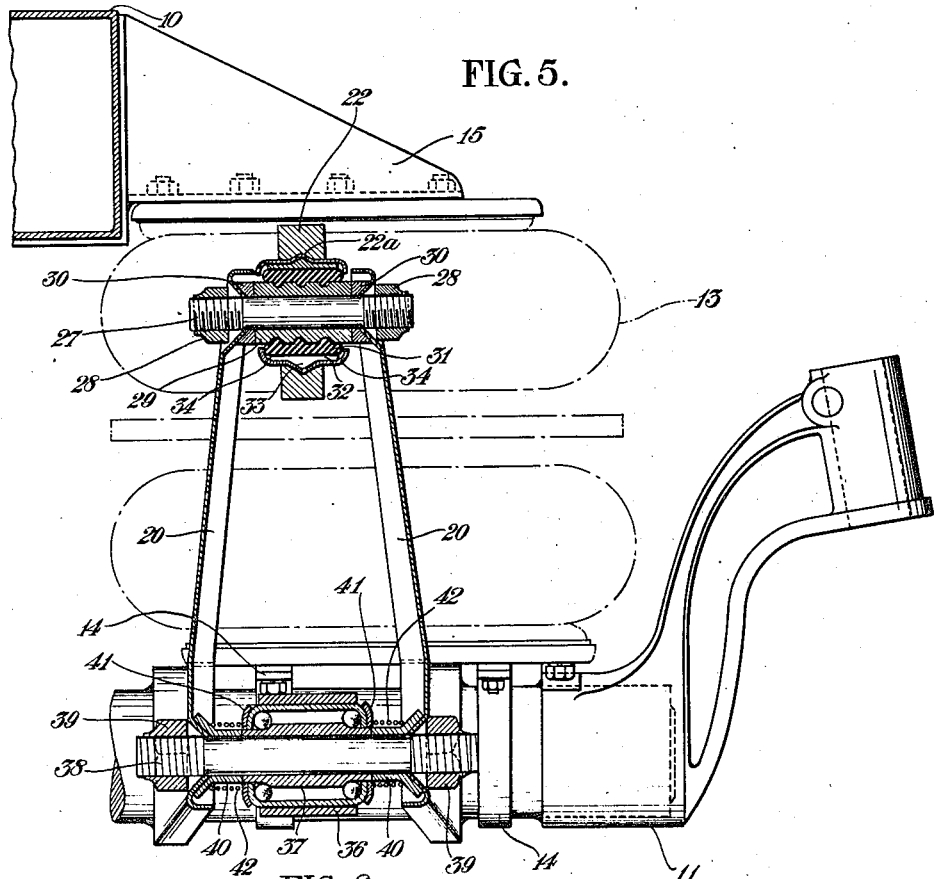
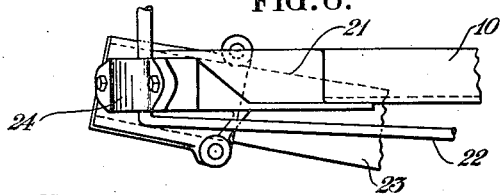
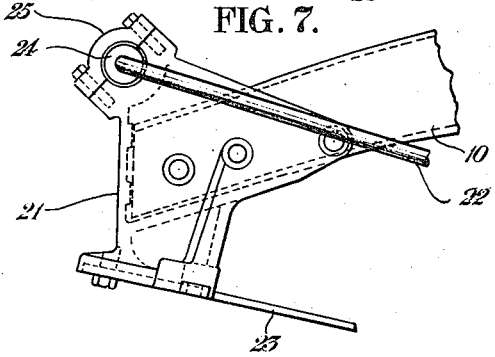
INVENTOR
Roy W. Brown
Albert L. Ely
ATTORNEY Patented July 16, 1940

2,208,538

UNITED STATES PATENT OFFICE 2,208,538

VEHICLE SUSPENSION

Roy Wilbur Brown, Akron, Ohio, assignor to The Firestone Tire & Rubber Company, Akron, Ohio, a corporation of Ohio Application September 17, 1937, Serial No. 164,350

2 Claims. (Cl. 267—11)

This invention relates to vehicle suspensions, and more especially it relates to improved suspensions for motor driven vehicles wherein the suspension comprises pneumatic load supporting devices.

The chief object of the invention is to provide, in a vehicle suspension of the character mentioned, an improved means for effecting lateral, torsional, and fore and aft stability of the vehicle frame and body; and to provide such stabilizing means both for the front and the rear axle of the vehicle. Other objects will be manifest as the specification proceeds.

Of the accompanying drawings:

Figure 3 is a plan view of one end portion of the front axle structure, showing the connection of the stabilizing elements thereto;

Figure 4 is an end elevation of the structure shown in Figure 3;

Figure 5 is a section on the line 5—5 of Figure 4;

Figure 6 is a fragmentary plan view, on a larger scale, of the connection between the stabilizing elements and one side of vehicle frame, at the front thereof; and Figure 7 is a side elevation of the structure shown in Figure 6.

Figures 1, 2:
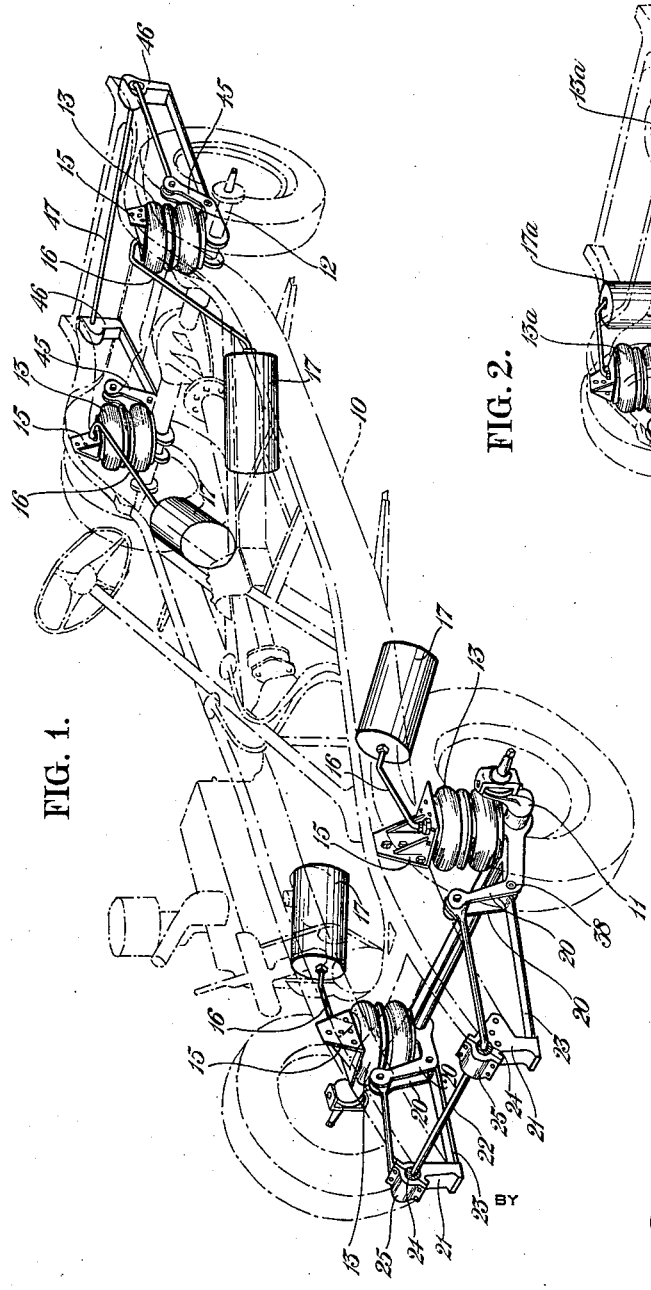
Figure 1 is a perspective view of the suspension system, in its preferred form, the vehicle chassis being shown in broken lines.
Figure 2 is a fragmentary view, similar to Figure 1, showing another embodiment of the invention applied to the rear of the vehicle.

Referring to Figure 1 of the drawings, 10 designates generally the frame of a motor vehicle of the passenger type, 11 and 12 are the front and rear axles thereof respectively, and 13, 13 are the bellows elements of pneumatic load-supporting devices positioned between the axles 11 and 12 and the frame 10. At the front of the vehicle the bellows 13 are positioned outside the frame 10, and at the rear they are positioned inside the frame. The bellows 13 are supported upon the axles by means of bracket-like clips 14, 14, Figure 3, and support the frame 10 by means of brackets 15 that are secured to the frame and project laterally therefrom, said brackets resting upon the upper ends of the respective bellows and being secured thereto. The bellows 13 are connected by respective pipes or conduits 16 to metal tanks or reservoirs 17, and there is a valve (not shown) in the fluid passage between each bellows and reservoir for controlling the flow of air therebetween.

Adjacent its respective ends, beneath the bellows 13, the front axle 11 is provided with a pair of integral, substantially parallel arms 20, 20 that are angular in shape, said arms extending forwardly from the axle and having their terminal portions upwardly extended substantially at right angles to their forwardly extending portions. (See Figures 3 to 5.) Mounted upon each side rail of the frame 10, at the front extremity thereof, is a bearing bracket 21, and mounted in the two bearing brackets is a generally C-shaped stabilizer rod 22 that extends across the front of the frame, the free ends of the rod extending rearwardly and being pivotally connected to the free ends of the arms 20. Rigidly secured to the bottom of each bearing bracket 21 is a flat strip 23 of spring metal, said strip extending rearwardly toward the axle 11, substantially parallel to rod 22, and having its end pivotally connected to the adjacent pair of arms 20 at the elbow or angle of the latter. The bearings of the respective brackets 21 consist of rubber bushings 24 that embrace the stabilizer rod 22, and are compressed thereabout by means of the caps 25 that retain them in place. The arrangement is such that movement of each bushing 23 relatively of the bracket 21 and stabilizer rod 22 is prevented, and angular movement of the latter relatively of the bearing brackets subjects the bushings to torque whereby such relative angular movement yieldingly is resisted.

The pivotal connection of the respective ends of stabilizer rod 22 to the pairs of arms 20 consists of oscillating joints comprising rubber. The construction is most clearly shown in Figure 5 wherein 27 is a spindle that is threaded at both ends and retained in the ends of adjacent arms 20 by nuts 28, 28 on its respective ends. Mounted upon the medial region of spindle 27 is a metal sleeve 29, there being washers 30 between the respective ends of the sleeve and the arms 20. The sleeve 29 has a force fit on spindle 27, and the washers 30 are tightly clamped thereagainst so that angular movement of the sleeve relatively of the spindle is prevented. Vulcanized to the outer periphery of sleeve 29 is a body of rubber 31, and circumscribing the latter is an annular collar 32 of smaller diameter than the rubber body for the purpose of imparting a compressive strain upon the latter. The arrangement also provides sufficient friction to prevent movement of the sleeve relatively of the surface of the rubber. The outer periphery of the collar 32 is formed with a central, outwardly extending, circumferential ridge or flange 33 that has sloping sides. Circumscribing the collar 32, in spaced relation thereto, is the flattened end portion of the stabilizer rod 22, the collar-circumscribing portion of the rod being formed on its inner periphery with a circumferential groove 22a. For securing the stabilizer rod 22 to the collar 32, a pair of cup-shaped members 34, 34 are forced between them, from opposite sides thereof, the inner or adjacent marginal portions of the members being flared or expanded by the collar-flange 33 and thereby being forced into the groove 22a of the stabilizer rod. The latter is thereby interlocked with the collar 32, and friction between the members 34 and the stabilizer rod and collar is sufficient to prevent relative angular movement of said rod and collar. The arrangement is such that angular movement of the stabilizer rod relatively of the arms 20 will impose torsional strain upon the rubber body 31 whereby such relative movement yieldingly is resisted.

That end of each metal strip 23 that is connected to a pair of arms 20 is formed with a terminal eye 36, Figure 4, which eye encircles a ball bearing 37 that is mounted upon a spindle 38 that is supported from its opposite ends by the respective arms 20 of the pair, nuts 39, 39 threaded onto the respective ends of the spindle retaining the same in place, as is most clearly shown in Figure 5. Mounted upon the spindle 38, between opposite ends of bearing 37 and the adjacent arms 20, are respective sleeves 40 that serve to maintain the bearing centrally of the spindle. At opposite ends of the bearing 37 are suitable gaskets 41, 41 that prevent the loss of lubricant therefrom, said gaskets being urged against the bearing-ends by compression springs 42, 42 that are mounted upon the respective sleeves 40, between said gaskets and tapered flanges on the outer ends of said sleeves. As will be seen by reference to Figure 6, the spring strips 23 are not positioned parallel to the frame 10 or to each other, but diverge somewhat from their fixed connection with the brackets 21, rearwardly to their pivotal connections with the arms 20.

As will be seen in Figure 1, the rearwardly extending arms of the stabilizer rod 22 and the spring strips 23 are substantially parallel to each other and substantially horizontally disposed when the frame 10 bears its normal load. Thus these members are especially adapted to resist fore and aft movement of the frame relatively of the axle 11, which movement will be substantially parallel to the planes of said members. Because of the rubber bushings in the pivotal connections of the stabilizer rod 22, and the stiffness of the metal of strips 23, these members also resist bound and rebound of the frame 10 to a certain extent and thus supplement the pneumatic suspension devices which are provided for this purpose. Lateral movement of the frame 10 relatively of the axle 11 also is resisted by the stabilizer rod 22 and spring strip 23, especially the latter for the reason that it strongly resists flexure in its own plane. When the frame 10 and axle 11 tilt angularly of each other, as when one of the wheels goes over a bump or drops into a depression, the rearwardly projecting portions of the stabilizer rod 22 are urged toward non-parallel relation, and thus place a torsional strain on the rod, the latter thereby opposing such angular movement. Because the spring strips 23 are nearer together at their fixed front ends than at their rear ends, such relative angular movement of frame and axle effects merely a flexing of said strips, and does not impose a torsional strain thereon as would be the case if the strips were parallel. Because the stabilizer rod and the spring strips are substantially horizontally disposed, bound and rebound of the frame and tilting thereof relatively of the axle does not result in any substantial fore and aft movement of the axle relatively of the frame, and steering of the vehicle is not materially affected.

The rear axle suspension is essentially similar to that of the front axle so that a brief description will suffice. The rear axle 12 is provided with pairs of rearwardly extending, angular arms 45, 45 that connect with the axle beneath the bellows of the pneumatic suspension devices. The side rails of the frame 10 are provided at their rear ends, on the under side thereof, with respective bearing brackets 46, and journaled in the latter is a C-shaped stabilizer rod 47, the end portions of which extend forwardly and are pivotally connected to the free ends of the respective pairs of arms 45. Spring metal strips 48, 48 are rigidly connected to the brackets 46 and extend forwardly therefrom to the respective pairs of arms 45 to which they are pivotally connected. The forwardly extending end portions of the stabilizer rod 47 and the spring strips 48 are substantially parallel to each other and substantially horizontally disposed, and they effect stabilization of the rear end of the vehicle in the same manner that stabilization of the front end is effected. Bound and rebound of the frame relatively of the rear axle, and relative angular movement of said members causes but little fore and aft movement of the members relatively of each other, but such as there is imposes no strain on the stabilizing elements for the reason that the driveshaft of the vehicle comprises two universal joints.

The embodiment of the invention shown in Figure 2 is essentially the same as that shown in Figure 1, except that the positions of some of the suspension elements are altered. Thus the reservoirs 17a of the hydraulic load-carrying devices are mounted upon the frame of the vehicle rearwardly of the bellows 13a of said devices. The stabilizer rod and spring strip are identical with those previously described except that they are disposed in front of the rear axle instead of forwardly thereof. This embodiment functions in the same manner as that previously described, and possesses all the advantages inherent in the latter.

Other modification may be resorted to without departing from the spirit of the invention, or the scope thereof as defined by the appended claims.

What is claimed is:

1. A suspension system adapted to be operably associated between an axle and frame of a vehicle, comprising resilient load supporting means having substantially no resistance to forces transverse to its load supporting direction, disposed between said axle and frame, a stabilizing structure comprising a torsion member pivoted to said frame at points spaced transversely of said frame, lever arms extending from said torsion member, and means flexible in a vertical plane but substantially rigid in a horizontal plane having one end thereof fixed to said frame, means for pivotally associating one of the ends of said lever arms with said axle at points displaced longitudinally and vertically from said axle and means for pivotally connecting the other ends of said flexible means with said axle at points substantially in the horizontal plane of the latter whereby the lever arms of said torsion member and said flexible means form parallelogram mechanisms adjacent each end of the axle permitting up and down relative movement between said axle and frame while determining the lateral and longitudinal position of the axle relative to the frame.

2. A suspension system for vehicles having an axle and frame, said system comprising resilient load supporting means having substantially no resistance to forces transverse to its load supporting direction, brackets extending away from each end of said axle, a leaf spring member having one end pivotally connected to said bracket and having the other end fixed to said frame at a point displaced longitudinally of said vehicle from said axle, said member being relatively thin in a vertical direction as compared to its lateral dimension, whereby relative vertical movements between said axle and frame are relatively free and unrestricted, while lateral movements are restricted, said brackets having upstanding arms in the vertical plane of the pivotal connection between said leaf spring and said bracket, a stabilizing structure comprising a torsionally resilient rod or tube pivoted to opposite sides of said frame, lever arms extending from said rod or tube, and pivotally connected to the arms of said axle brackets, whereby said lever arms and said leaf springs form a parallelogram mechanism determining the lateral and longitudinal position of the axle relative to the frame.

ROY WILBUR BROWN.